United States Patent Office 3,810,980
Patented May 14, 1974

3,810,980
INSECTICIDAL AND ACARICIDAL FORMULA-
TION OF INCREASED STABILITY
Heinrich Pohlmann, Leverkusen, and Karl-Julius Schmidt,
Wuppertal-Vohwinkel, Germany, assignors to Bayer
Aktiengesellschaft, Leverkusen, Germany
No Drawing. Continuation-in-part of application Ser. No.
205,313, Dec. 6, 1971, which is a continuation of appli-
cation Ser. No. 2,952, Jan. 14, 1970, both now aban-
doned. This application Aug. 24, 1972, Ser. No. 283,443
Claims priority, application Germany, Jan. 23, 1969,
P 19 03 228.1
Int. Cl. A01n 9/36
U.S. Cl. 424—200
14 Claims

ABSTRACT OF THE DISCLOSURE

Formulation of increased stability containing (1) the normally unstable insecticidally and acaricidally active compound O,O - diethyl-O-quinoxal-2-yl-thionophosphoric ester, e.g. in an amount of about 20–80% by weight, (2) a diluent such as a higher boiling hydrocarbon and/ or higher boiling ester, e.g. in an amount of about 15– 80% by weight, and (3) a stabilizer such as (a) a tertiary amine, e.g. in an amount of about 0.1–10% by weight, (b) a dipolar aprotic solvent, e.g. in an amount of about 0.01–10% by weight, or a mixture of (a) and (b) in an amount of about 0.01–20% by weight; optionally including (4) a surfactant such as emulsifying and/or dispersing agent; and methods of improving and increasing the stability, e.g. in storage, of O,O-diethyl-O-quinoxal-2-yl-thionophosphoric acid ester, especially when associated or admixed with diluents, which contemplate the admixing of the above-noted components, (1), (2) and (3), and optionally also (4), e.g. in the stated amounts.

---

This application is a continuation-in-part of Application Ser. No. 205,313, filed Dec. 6, 1971, now abandoned, which in turn is a continuation application of application Ser. No. 2,952, filed Jan. 14, 1970, now abandoned.

The present invention relates to and has for its objects the provision of particular new formulations of increased stability containing (1) the normally unstable insecticidally and acaricidally active compound O,O-diethyl-O-quinoxal - 2 - yl-thionophosphoric acid ester, e.g. in an amount of about 20–80% by weight, (2) a diluent such as a higher boiling hydrocarbon and/or higher boiling ester, e.g. in an amount of about 15–80% by weight, and (3) a stabilizer such as (a) a tertiary amine, e.g. in an amount of about 0.1–10% by weight, (b) a dipolar aprotic solvent, e.g. in an amount of about 0.01–10% by weight, or a mixture of (a) and (b) in an amount of about 0.01–20% by weight; optionally including (4) a surfactant such as an emulsifying and/or dispersing agent; and methods of improving and increasing the stability, e.g. in storage, of O,O - diethyl-O-quinoxal-2-yl-thionophosphoric acid ester, especially when associated or admixed with diluents, which contemplate the admixing of the abovenoted components (1), (2) and (3), and optionally also (4), e.g. in the stated amounts; with other and further objects becoming apparent from a study of the within specification and accompany examples.

O,O - diethyl - O - quinoxal-2-yl-thionophosphoric acid ester of the formula

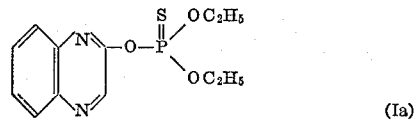

(Ia)

is known as an insecticidally and acaricidally effective compound (cf. British Pat. 1,081,249).

However, this active Compound Ia has proved to be unstable during storage, so that it does a part of its insecticidal effectiveness, to an extent which depends on the temperature or on the emulsifiers and solvents used in association therewith.

The mechanism of the degradation reaction which takes place is based on an initial isomerization of such active Compound Ia into presumably the corresponding thiol ester (A), which is converted into the corresponding monosulfide (B), with the splitting off of acidic phosphorus compounds, in accordance with the following presumed formula scheme:

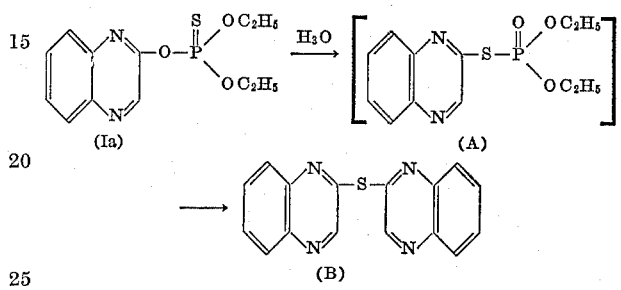

Active Compound Ia is sufficiently unstable to make its practical use as an insecticide or acaricide difficult or impossible. It would be very desirable, of course, to provide some means of overcoming this difficulty.

It is furthermore known that similar rearrangements can be avoided in the case of the analogous N-monomethylamide of O,O - dimethyl-dithio-phosphoryl-acetic acid (cf. German Published Patent 1,175,939) of the formula

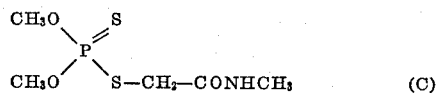

(C)

by the use of suitable solvents such as ethylene glycol monoethyl ether acetate (D), primary amyl acetate (IIa) or cyclohexanone (E), possibly in admixture with hydrocarbons, such as xylene (IIb). The solvent proportion of the formulation is stated as being about 75% of the total formulation.

Experiments which were carried out with O,O-diethyl-O - quinoxal - 2 - yl - thionophosphoric acid ester (Ia) under the conditions stated in said German Published Patent 1,175,939, however, did not bring any improvement of the stability of this active compound beyond the known effect of stabilization by conventional dilution.

It has now been found, in accordance with the present invention, that relatively stable formulations may now be provided, which consist essentially of (a) 20 to 80% by weight of the insecticidally and acaridally effective compound O,O-diethyl-O-quinoxal-2-yl-thionophosphoric acid esters of the formula

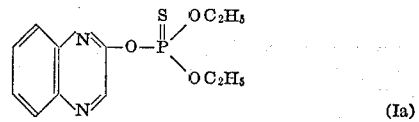

(Ia)

(2) 15 to 80% by weight of inert, higher-boiling hydrocarbon and/or ester as diluent, and
(3a) 0.1 to 10% by weight of tertiary amine and/or
(3b) 0.01 to 10% by weight of dipolar aprotic solvent, as stabilizer.

Preferred examples of dipolar aprotic solvents (which are solvents which neither yield a proton to the solute nor gain one from it) include dimethyl sulfoxide (IVa), N-methyl-pyrrolidone (IIIa) and compounds of the type

in which the acyl radical is one of the following:

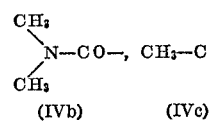 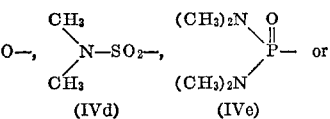 
(IVb)    (IVc)    (IVd)    (IVe)

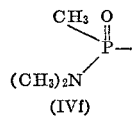
(IVf)

It is very surprising that the formulations according to the invention possess a high stability, i.e. markedly increased over that heretofore possible.

It might have been expected that tertiary amines, in the conditions obtaining in practice, especially in the presence of air and moisture, would favor the decomposition of such active Compound Ia, since, generally, the ready hydrolyzability of esters of this type in a weakly alkaline range is known (compare, for example, the discussion of the hydrolysis of O,O-diethyl-O-(4-nitrophenyl)-thionophosphoric acid ester (F) in G. Schrader, "Die Entwicklung neuer insektizider Phosphorsaure-Ester," p. 240).

It was further to be expected that the use of compounds such as dimethyl sulfoxide (IVa) would also accelerate the degradation of such active Compound Ia. This disadvantageous effect of dimethyl sulfoxide on thionophosphoric acid esters, generally, is known from the literature (compare M. Mikolajczyk, Angew. Chem. 78, p. 393 (1966) and Chem. and Ind. 1966, p. 2059); it consists in an oxidation of the PS group according to the equation:

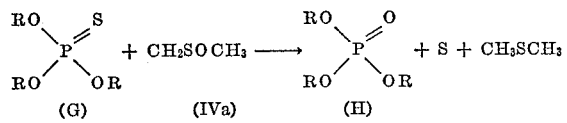

in which R is lower alkyl.

It was, therefore, in no way to be foreseen that an addition of substantially smaller amounts of dimethyl sulfoxide (IVa) would decisively improve the stability of such active Compound Ia as the following experimental results show.

It was, moreover, surprising that the above-mentioned phosphoric acid tris-(dimethylamide) of the formula

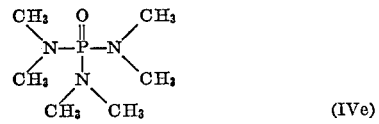
(IVe)

comparable to dimethyl formamide (J) prevents the acidic decomposition of active Compound Ia for a time sufficient for practical purposes.

Exploratory experiments with the solvent dimethyl formamide (J), very commonly used in the art, revealed no improvement of stability, irrespective of the proportions chosen, when associated with such Compound Ia. The same poor results were also found, for instance, with the common solvent methylisobutyl ketone (K).

The ability of the instant stabilizer adjuvants found usable according to the present invention, even in small amounts, to prevent for a substantial time the decomposition of O,O-diethyl-O-quinoxal-2-yl-thionophosphoric acid ester into bis-quinoxal-2-yl-sulfide therefore represents a valuable contribution to the art.

The diluents [ingredient (2)] are generally defined by the above designation. Mixtures thereof may be used. As examples, there are mentioned chlorobenzene (IIc), toluene (IId), xylene (IIb), phosphoric acid O,O,O-triethyl ester (IIe) and primary amyl acetate (IIa), i.e. aromatic hydrocarbons or chlorinated aromatic hydrocarbons having a boiling point above about 80° C., preferably about 80 to 140° C., tri lower alkyl phosphoric acid esters and/or lower alkyl-lower alkanoates wherein each alkyl group has up to about 5 carbon atoms and is preferably methyl.

Preferred stabilizers [ingredient (3)] include triethylamine (IIIb), pyridine (IIIc), N-methylpiperidine (IIId), N,N-dimethyl-N-benzyl-amine (IIIe), collidine (IIIf) [especially 2-methyl-4-ethyl-pyridine] and/or dimethyl sulfoxide (IVa), N-methyl-pyrrolidone (IIIa), tetramethyl urea (IVb), dimethyl-acetamide (IVc), sulfuric acid bis-(di-methylamide) (IVd), phosphoric acid tris-(dimethylamide) (IVe) and methane-phosphoric acid bis-(dimethylamide) (IVf). Mixtures of any and all such stabilizers can be used.

Preferably, such active Compound Ia is used in substantially between about 20 to 30 or 50 to 80% by weight formulations.

The content of diluent [ingredient (2)] is preferably an amount correspondingly substantialy between about 15 to 40 or 70 to 80% by weight.

The tertiary amines [ingredient (3a)] which may be used as stabilizers are preferably present in amounts of corespondingly substantially between about 1 to 8% by weight, and the dipolar aprotic solvents [ingredient (3b)] which may be used as stabilizers are preferably present in an amount of correspondingly substantially between about 0.1 to 7% by weight.

Even so, ingredients (3a) and (3b) can be present correspondingly overall in an amount of 0.01–20, and preferably 0.1–15% by weight.

Conveniently, if desired, substantially between about 50–150, and preferably between about 80–140% by weight of a conventional surface-active agent, i.e. surfactant, can be included optionally in the formulation, based on the amount by weight of Compound Ia present. Such surfactants include, for example, nonionic and/or anionic emulsifying agents (e.g. polyethylene oxide esters of fatty acids, polyethylene oxide ethers of aftty alcohols, alkyl sulfonates, aryl sulfonates, etc., and especially alkyl aryl-polyglycol ethers, magnesium stearate, sodium oleate, etc.) and/or dispersing agents, such as lignin, sulfite waste liquors, methyl cellulose, etc. Benzyloxydiphenyl polyglycol ether with a chain length of about 5 to 20, preferably about 10 to 12 carbon atoms, is preferred. Such ethers are disclosed in U.S. Pats. Nos. 2,213,477 and 2,630,457.

Advantageously, the instant formulations may be used for combating insect and acarid pests in agriculture and elsewhere in known manner, and may include such surfactants of the conventional type without detriment to the the stability of Compound Ia.

The present invention therefore also provides an improved method of combating insect or acarid pests which comprises applying to the pests or a pest habitat a formulation of increased stability according to the present invention alone or further diluted with a solid or liquid diluent or carrier and/or surfactant, e.g. of the conventional type used for pesticides.

The present invention also permits crops to be protected from damage by insects or acarids by being grown in areas in which, immediately prior to and/or during the time of the growing, a formulation of increased stability according to the present invention is applied alone or in admixture with a solid or liquid diluent or carrier, and/or surfactant, e.g. of the conventional type used for pesticides.

The following examples illustrate, without limitation, the increased stability formulations of the present invention.

EXAMPLE 1

Qualitative stabilization experiments

Solutions of 80 parts of the active compound, i.e. O,O-diethyl-O-quinoxal-2-yl-thionophosphoric acid ester (Ia), and 17 parts of xylene were stored at 60° C. with, in each case, 3 parts of the additive stabilizers stated in Table 1 below, as well as (for comparison) without any additive stabilizer. At the intervals of time which can be seen from Table 1, samples were taken and investigated by thin-layer chromatography (system: silica gel HF, flow-medium: petroleum ether-acetone 9:1, detection: $UV_{254}$, $PdCl_2$). The experiment was terminated when the degradation product bis-quinoxal-2-yl-sulfide occurred (at a Rf value 0.66 with reference to Rf value of the active compound as unity, on basis of mean from 5 chromatograms). In the following Table I, (—) means no bis-(quinoxal-2-yl)-sulfide, (+) means traces thereof, and (++) means distinct amounts of such sulfide.

TABLE 1.—STABILIZING EFFECT

| Active compound preparation | Days storage at 60° C. | | | | | |
|---|---|---|---|---|---|---|
| | 13 | 28 | 44 | 61 | 79 | 107 |
| (Comparison); (A) 80% active compound (purest) plus 20% xylene (IIb) | — | + | ++ | | | |
| (Invention); 80% active compound (puerst) plus 17% xylene (IIb): | | | | | | |
| (1) Plus 3% dimethyl sulfoxide (IVa) | — | — | — | — | — | — |
| (2) Plus 3% dimethyl benzyl-amine (IIIe) | — | — | — | — | — | ++ |
| (3) Plus 3% collidine (IIIf) | — | — | — | + | + | ++ |
| (4) Plus 3% N-methyl-pyrrolidone (IIIa) | — | — | — | — | + | ++ |
| (5) Plus 3% phosphoric acid tris-(dimethyl-amide) (IVe) | — | — | — | — | — | — |
| (6) Plus 3% tetramethyl urea (IVb) | — | — | — | — | + | ++ |
| (7) Plus 3% methane-phosphonic acid bis-(dimethylamide) (IVf) | — | — | — | + | + | + |
| (8) Plus 3% dimethyl-acetamide (IVc) | — | — | — | + | ++ | |
| (9) Plus 3% sulfuric acid bis-(dimethyl-amide) (IVd) | — | — | + | + | ++ | |

EXAMPLE 2

Quantitative stabilization experiments

The solutions and formulations set forth in Table II below were stored at 40° C.; their contents of the active compound, i.e., O,O-diethyl-O-quinoxal-2-yl-thionophosphoric acid ester (Ia), were determined at intervals of, in each case, four weeks, by thin-layer chromatography, IR spectroscopy and analytically. Chromatographically pure as well as technical-grade active compound was used.

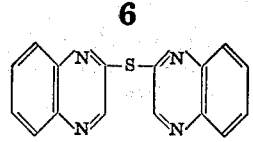

(B)

2580 g. O,O-diethyl-O-quinoxal-2-yl-thionophosphoric acid ester were mixed with 10 ml. of 50% acetic acid and allowed to stand for three days in a drying chamber at 60–70° C. Yellowish needles crystallized out. The decomposition mixture was kept at —10° C. for several hours, the liquid components were filtered off with suction and the solid residue was recrystallized from benzene-ligroin.

Yield: 792 g. (62.5% of the theory) bis-(quinoxal)-2-yl-sulfide. Melting point: 157–158° C.

*Analysis.*—Calculated for $C_{16}H_{10}N_4S$ (molecular weight 290.3): C, 66.18%; H, 3.48%; N, 19.30%; S, 11.05%; Found: C, 66.21%; H, 3.91%; N, 19.04%; S, 11.01%.

It will be realized by the artisan that all of the foregoing types of formulations containing, in addition to (1) Compound Ia, one or more (2) diluents such as Compounds IIa to IIe above, and one or more (3) stabilizers such as Compounds IIIa to IIIf above and/or compounds IVa to IVf above, and optionally a surfactant as noted above, in the stated amounts in percent by weight, will provide increased stability for such Compound Ia over extended periods of time, e.g. in storage, whereupon such formulations can then be used, alone or in admixture with a conventional pesticide solid or liquid diluent or carrier as noted above, for application to insects, acarids (i.e., arthropods) and/or their habitat, such that Compound Ia will remain stable and active and be able to exert its intended arthropodicidal effect at the end point of use thereof.

It will be appreciated that the instant specification and examples are set forth by way of illustration and not limitation, and that various modifications and changes may be made without departing from the spirit and scope of the present invention, which is to be limited only by the scope of the appended claims.

TABLE 2.—DEGRADATION OF VARIOUS FORMULATIONS OF ACTIVE COMPOUND

| Active compound [1] | Type and wt. percent of— | | Emulsifier [2] | Storage temperature: 40° C. content of active compound in percent with reference to 100% initial active compound after— | | | |
|---|---|---|---|---|---|---|---|
| | Solvent | Stabilizer | | 0 week | 4 weeks | 8 weeks | 12 weeks |
| 1 | 20 Xylene 80 | | | 99 | 87 | 76 | 46.5 |
| 2 | 20 Cyclohexanone 80 | | | 96 | 30.5 | 15.5 | |
| 3 | 20 Glycolmonoethyl ether acetate 80 | | | 98.5 | 85.5 | 75 | 46 |
| 4 | 20 Amyl acetate 80 | | | 98 | 82 | 54.5 | |
| 5 | 20 Dimethyl formamide 80 | | | 92 | 80 | 64 | |
| 6 | 20 Dimethyl sulfoxide 80 | | | 69.5 | 15 | 7 | |
| 7 | 20 Methyl-isobutyl ketone 80 | | | 95 | 76 | 38.5 | |
| 8 | 50 Xylene 50 | | | 89.2 | 71.2 | | |
| 9 | 80 Xylene 20 | | | 92.6 | 68.7 | | |
| 10 | 25 Xylene 42 | Dimethyl sulfoxide 3 | 30 | 95.2 | 88.8 | | 84 |
| 11 | 25 do | Phosphoric acid tris-(dimethyl amide) 3 | 30 | 96 | 90 | | 89 |
| 12 | 25 do | Tetramethyl urea 3 | 30 | 97.6 | 93.2 | 87.2 | 78.8 |
| 13 | 20 Xylene 70 | Dimethyl sulfoxide 10 | | 95 | 83 | 78 | 75 |
| 14 | 20 Xylene 40 | do | 30 | 95 | 81 | 75 | 73 |

[1] O,O-diethyl-O-quinoxal-2-yl-thionophosphoric acid ester.
[2] Benzylhydroxy diphenyl polyglycolether (10-12 carbon atoms in chain).

COMPARATIVE EXAMPLE 3

Preparation of bis-(quinoxal-2-yl)-sulfide by decomposition of O,O-diethyl-O-quinoxal-2-yl-thionophosphoric acid ester

What is claimed is:

1. An insecticidal and acaricidal formulation of increased stability which consists essentially of (1) substantially between about 20–80% by weight of O,O-diethyl - O - quinoxal-2-yl-thionophosphoric acid ester of the formula

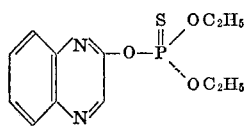

(2) substantially between about 15–80% by weight of a diluent selected from the group consisting of aromatic hydrocarbons boiling above about 80° C., chlorinated aromatic hydrocarbons boiling above about 80° C., and tri-lower alkyl phosphoric acid esters wherein the alkyl group has up to 5 carbon atoms, and
(3) a stabilizer selected from the group consisting of
   (a) substantially between about 0.1–10% by weight of a tertiary amine selected from the group consisting of triethylamine, pyridine, N-methylpiperidine, N,N - dimethyl - N - benzylamine, collidine and mixtures thereof,
   (b) substantially between about 0.01–10% by weight of a dipolar aprotic solvent selected from the group consisting of dimethyl sulfoxide, N-methylpyrrolidone, and

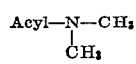

wherein Acyl is

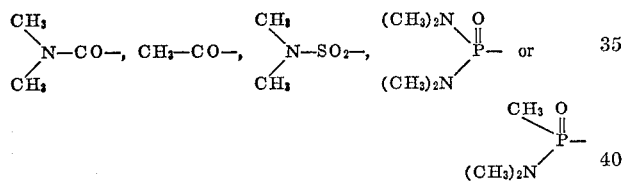

and,
   (c) substantially between about 0.01–20% by weight of a mixture of (a) and (b).

2. The formulation of claim 1 wherein said O,O-diethyl-O-quinoxal-2-yl-thionophosphoric acid ester is present in an amount of substantially between abou 20–30% by weight, said diluent is present in an amount of substantially between about 70–80% by weight, and said stabilizer, when (a), is present in an amount of substantially between about 1–8% by weight, said stabilizer, when (b), is present in an amount of substantially between about 0.1–7% by weight, and said stabilizer, when a mixture of (a) and (b), is present in an amount of substantially between about 0.1–15% by weight.

3. The formulation of claim 1 wherein said O,O-diethyl-O-quinoxal-2-yl-thionophosphoric acid ester is present in an amount of substantially between about 50–80% by weight, said diluent is present in an amount of substantially between about 15–40%, by weight, and said stabilizer, when (a), is present in an amount of substantially between about 1–8% by weight, said stabilizer, when (b), is present in an amount of substantially between about 0.1–7% by weight, and said stabilizer, when a mixture of (a) and (b), is present in an amount of substantially between about 0.1–15% by weight.

4. The formulation of claim 1 wherein said diluent is selected from the group consisting of amyl acetate, xylene, chlorobenzene, toluene, and phosphoric acid O,O,O-triethyl ester.

5. The formulation of claim 1 wherein said stabilizer is present in an amount of about 3% by weight.

6. The formulation of claim 1 wherein an emulsifier is also present in said formulation in an amount of substantially between about 50–150% by weight based on the amount of said O,O-diethyl-O-quinoxal-2-yl-thionophosphoric acid ester present.

7. A method of increasing the stability O,O-diethyl-O-quinoxal-2-yl-thionophosphoric acid ester in diluent formulations which consists essentially of admixing
   (1) substantially between about 20–80% by weight of O,O-diethyl-O-quinoxal-2-yl-phosphoric acid ester of the formula

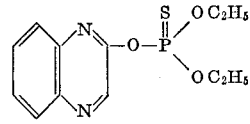

(2) substantially between about 15–80% by weight of a diluent selected from the group consisting of higher boiling aromatic hydrocarbons, higher boiling chlorinated aromatic hydrocarbons, tri-lower alkyl phosphoric acid esters, and lower alkyl-lower alkanoates, and
   (3) a stabilizer selected from the group consisting of
      (a) substantially between about 0.1–10% by weight of a tertiary amine,
      (b) substantially between about 0.01–10% by weight of a dipolar aprotic solvent selected from the group consisting of dimethyl sulfoxide, N-methylpyrrolidone, and

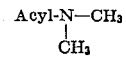

wherein Acyl is

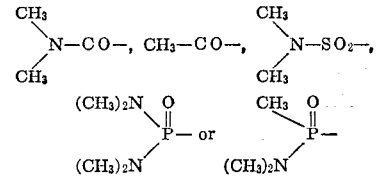

and,
   (c) substantially between about 0.01–20% by weight of a mixture of (a) and (b).

8. The method of claim 7 wherein said O,O-diethyl-O-quinoxal-2-yl-thionophosphoric acid ester is present in an amount of substantilly between about 20–30% by weight, said diluent is present in an amount of substantially between about 70–80% by weight, and said stabilizer, when (a), is present in an amount of substantially between about 1–8% by weight, said stabilizer, when (b), is present in an amount of substantially between about 0.1–7% by weight, and said stabilizer, when a mixture of (a) and (b), is present in an amount of substantially between about 0.1–15% by weight.

9. The method of claim 7 wherein said O,O-diethyl-O-quinoxal-2-yl-thionophosphoric acid ester is present in an amount of substantially between about 50–80% by weight, said diluent is present in an amount of substantially between about 15–40% by weight, and said stabilizer, when (a), is present in an amount of substantially between about 1–8% by weight, said stabilizer, when (b), is present in an amount of substantially between about 0.1–7% by weight, and said stabilizer, when a mixture of (a) and (b), is present in an amount of substantially between about 0.1–15% by weight.

10. The method of claim 7 wherein said diluent is selected from the group consisting of amyl acetate, xylene, chlorobenzene, toluene, and phosphoric acid O,O,O-triethyl ester.

11. The method of claim 7 wherein said stabilizer is present in an amount of about 3% by weight.

12. The method of claim 7 wherein an emulsifier is also admixed in said formulation in an amount of substantially between about 50–150% by weight based on the amount of said O,O-diethyl-O-quinoxal-2-yl-thionophosphoric acid ester present.

13. The formulation of claim 1 wherein said diluent is an aromatic hydrocarbon boiling above about 80° C.

14. The method of claim 7 wherein said diluent is an aromatic hydrocarbon boiling above about 80° C.

References Cited

FOREIGN PATENTS 1,081,249    8/1967    Great Britain _____ 424—200

ALBERT T. MEYERS, Primary Examiner

F. E. WADDELL, Assistant Examiner